United States Patent
Salmela et al.

(10) Patent No.: US 11,296,878 B2
(45) Date of Patent: Apr. 5, 2022

(54) PRIVATE KEY UPDATING

(71) Applicant: Telefonaktiebolaget LM Ericsson (publ), Stockholm (SE)

(72) Inventors: Patrik Salmela, Espoo (FI); Miika Komu, Helsinki (FI); Alireza Ranjbar, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 259 days.

(21) Appl. No.: 16/484,371

(22) PCT Filed: Feb. 8, 2017

(86) PCT No.: PCT/EP2017/052770
§ 371 (c)(1),
(2) Date: Aug. 7, 2019

(87) PCT Pub. No.: WO2018/145742
PCT Pub. Date: Aug. 16, 2018

(65) Prior Publication Data
US 2021/0135864 A1    May 6, 2021

(51) Int. Cl.
*H04L 9/08* (2006.01)
*H04L 9/00* (2006.01)
*H04L 29/06* (2006.01)

(52) U.S. Cl.
CPC ........... *H04L 9/0891* (2013.01); *H04L 9/002* (2013.01); *H04L 9/0833* (2013.01); *H04L 9/0838* (2013.01)

(58) Field of Classification Search
CPC ..... H04L 9/0891; H04L 9/002; H04L 9/0833; H04L 9/0838; H04L 9/3247; H04L 63/06; H04L 63/0823; H04L 63/126
See application file for complete search history.

(56) References Cited

U.S. PATENT DOCUMENTS 6,856,800 B1 * 2/2005 Henry ................ H04W 12/082
455/411
2011/0246756 A1 * 10/2011 Smith ...................... H04L 9/32
713/2

(Continued)

FOREIGN PATENT DOCUMENTS

CN 102546161 A 7/2012
CN 104009837 A 8/2014

(Continued)

OTHER PUBLICATIONS

TPM Main Part 1 Design Principles, Specification Version 1.2, Revision 116, Mar. 1, 2011, TCG Published. (184 pages).

(Continued)

*Primary Examiner* — Vu V Tran
(74) *Attorney, Agent, or Firm* — Rothwell, Figg, Ernst & Manbeck, P.C.

(57) ABSTRACT

There is provided mechanisms for updating a private key of a host entity. The private key is based on parameters negotiated between the host entity and a key issuer. The host entity further has a group public key that is generated by the key issuer and associated with the private key. A method is performed by the host entity. The method comprises obtaining a need to acquire a new private key. The method comprises, in response thereto, performing a private key update procedure with the key issuer using the public key and the current private key, wherein parameters for the new private key are negotiated with the key issuer. The method comprises generating the new private key using the negotiated parameters.

20 Claims, 7 Drawing Sheets

(56) References Cited

U.S. PATENT DOCUMENTS

| | | | |
|---|---|---|---|
| 2014/0095878 A1* | 4/2014 | Shimano | H04L 9/0825 |
| | | | 713/171 |
| 2014/0181513 A1* | 6/2014 | Marek | H04W 12/50 |
| | | | 713/168 |
| 2018/0234237 A1* | 8/2018 | Ye | H04L 9/14 |

FOREIGN PATENT DOCUMENTS

| | | |
|---|---|---|
| CN | 106209756 A | 12/2016 |
| EP | 1 326 368 A2 | 7/2003 |

OTHER PUBLICATIONS

Stefan Berger et al., "vTPM: Virtualizing the Trusted Platform Module", USENIX Association, Security '06: 15th USENIX Security Symposium, Hawthorne, NY (2006). (16 pages).

Prof. Dr. Mark Manulis et al., "Group Signatures: Authentication with Privacy", Bundesamt für Sicherheit in der Informationstechnik (2012). (267 pages).

International Search Report and Written Opinion issued in International Application No. PCT/EP2017/052770, dated Sep. 28, 2017, (13 pages).

* cited by examiner

PRIVATE KEY UPDATING

CROSS REFERENCE TO RELATED APPLICATION(S)

This application is a 35 U.S.C. § 371 National Stage of International Patent Application No. PCT/EP2017/052770, filed Feb. 8, 2017, designating the United States.

TECHNICAL FIELD

Embodiments presented herein relate to methods, a host entity, a key issuer, computer programs, and a computer program product for updating a private key of the host entity.

BACKGROUND

One parameter in providing good performance and capacity for a given communications protocol in a communications network is the ability to provide secure handling of security critical data, such as security critical data of individual users. One non-limiting example of security critical data is credentials; depending on the scenario there can be also other types of security critical data such as health data, financial data or an interface that can be used for triggering some action, which should only be accessible to authorized users.

A typical approach to increase security, be it to a cloud provider or any other service provider, is to deploy asymmetric (e.g. a public key mechanism) or symmetric (e.g. a shared passphrase mechanism) encryption. However, these mechanisms are generally based on a set of trust relations between the users and the cloud/platform providers. As an example, the trust may be at stake when the user switches between providers as the old provider may able to store the security credentials even after a service is moved from their networks.

The concept of Trusted Platform Modules (TPM) can be used to protect security credentials and to provider integrity for platforms, especially at the client side. While TPM was originally proposed for hardware platforms, it is also possible to deploy a virtual TPM (vTPM) for virtual systems (such as virtual machines (VM) or containers). When using vTPM the credentials should never be available in the virtualized system's memory in plain-text as they are then also accessible to the platform.

Assume that a host entity uses asymmetric key based credentials, which means that the public key (or equivalently a representation or reference of the public key (such as a hash of the public key, or a certificate of the public key)) acts as the identity of the host entity and the private key acts as the authentication credentials. Assume further that it is suspected that the private key has leaked, e.g. when the host entity is moved from one platform provider to another platform provider. Thus, if the identity is to be kept constant the authentication credentials would typically not be able to be changed without the identity (public key) being changed. In turn, this would mean that if it is suspected that the previous platform provider has leaked the authentication credentials, a new identity (public key) must be generated. This in turn requires extra computational as well as management resources as the identity of host entity needs to be replaced in all services used by the host entity.

Hence, there is still a need for a mechanisms for improved updating of a private key of a host entity.

SUMMARY

An object of embodiments herein is to provide mechanisms for efficient updating of a private key of a host entity.

According to a first aspect there is presented a method for updating a private key of a host entity. The private key is based on parameters negotiated between the host entity and a key issuer. The host entity further has a group public key that is generated by the key issuer and associated with the private key. The method is performed by the host entity. The method comprises obtaining a need to acquire a new private key. The method comprises, in response thereto, performing a private key update procedure with the key issuer using the public key and the current private key, wherein parameters for the new private key are negotiated with the key issuer. The method comprises generating the new private key using the negotiated parameters.

According to a second aspect there is presented a host entity for updating a private key of the host entity. The private key is based on parameters negotiated between the host entity and a key issuer. The host entity further has a group public key that is generated by the key issuer and associated with the private key. The host entity comprises processing circuitry. The processing circuitry is configured to cause the host entity to obtain a need to acquire a new private key. The processing circuitry is configured to cause the host entity to, in response thereto, perform a private key update procedure with the key issuer using the public key and the current private key, wherein parameters for the new private key are negotiated with the key issuer. The processing circuitry is configured to cause the host entity to generate the new private key using the negotiated parameters.

According to a third aspect there is presented a host entity for updating a private key of the host entity. The private key is based on parameters negotiated between the host entity and a key issuer. The host entity further has a group public key that is generated by the key issuer and associated with the private key. The host entity comprises processing circuitry and a storage medium. The storage medium stores instructions that, when executed by the processing circuitry, cause the host entity to, perform operations, or steps. The operations, or steps, cause the host entity to obtain a need to acquire a new private key. The operations, or steps, cause the host entity to, in response thereto, perform a private key update procedure with the key issuer using the public key and the current private key, wherein parameters for the new private key are negotiated with the key issuer. The operations, or steps, cause the host entity to generate the new private key using the negotiated parameters.

According to a fourth aspect there is presented a host entity for updating a private key of the host entity. The private key is based on parameters negotiated between the host entity and a key issuer. The host entity further has a group public key that is generated by the key issuer and associated with the private key. The host entity comprises an obtain module configured to obtain a need to acquire a new private key. The host entity comprises an update module configured to, in response thereto, perform a private key update procedure with the key issuer using the public key and the current private key, wherein parameters for the new private key are negotiated with the key issuer. The host entity comprises a generate module configured to generate the new private key using the negotiated parameters.

According to a fifth aspect there is presented a computer program for updating a private key of a host entity, the computer program comprising computer program code which, when run on processing circuitry of the host entity, causes the host entity to perform a method according to the first aspect.

According to a sixth aspect there is presented a method for updating a private key of a host entity. The private key is based on parameters negotiated between the host entity and a key issuer. The host entity further has a group public key that is generated by the key issuer and associated with the private key. The method is performed by the key issuer. The method comprises performing a private key update procedure with the host entity using the public key and the current private key, wherein parameters for the new private key are negotiated with the host entity. The method comprises causing the current private key to be revoked.

According to a seventh aspect there is presented a key issuer for updating a private key of a host entity. The private key is based on parameters negotiated between the host entity and a key issuer. The host entity further has a group public key that is generated by the key issuer and associated with the private key. The key issuer comprises processing circuitry. The processing circuitry is configured to cause the key issuer to perform a private key update procedure with the host entity using the public key and the current private key, wherein parameters for the new private key are negotiated with the host entity. The processing circuitry is configured to cause the key issuer to cause the current private key to be revoked.

According to an eighth aspect there is presented a key issuer for updating a private key of a host entity. The private key is based on parameters negotiated between the host entity and a key issuer. The host entity further has a group public key that is generated by the key issuer and associated with the private key. The key issuer comprises processing circuitry and a storage medium. The storage medium stores instructions that, when executed by the processing circuitry, cause the key issuer to perform operations, or steps. The operations, or steps, cause the key issuer to perform a private key update procedure with the host entity using the public key and the current private key, wherein parameters for the new private key are negotiated with the host entity. The operations, or steps, cause the key issuer to cause the current private key to be revoked.

According to a ninth aspect there is presented a key issuer for updating a private key of a host entity. The private key is based on parameters negotiated between the host entity and a key issuer. The host entity further has a group public key that is generated by the key issuer and associated with the private key. The key issuer comprises an update module configured to perform a private key update procedure with the host entity using the public key and the current private key, wherein parameters for the new private key are negotiated with the host entity. The key issuer comprises a revoke module configured to cause the current private key to be revoked.

According to a tenth aspect there is presented a computer program for updating a private key of a host entity, the computer program comprising computer program code which, when run on processing circuitry of a key issuer, causes the key issuer to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously, these methods, these host entities, these key issuers, and these computer programs provide efficient updating of the private key of the host entity.

Advantageously, the host entity is thereby enabled to change its private key (of an asymmetric key pair) without having to change the corresponding public key. In this way, when the public key is used as an identity of the host entity, the identity of the host entity owning the private key(s) remains the same.

Advantageously, a host entity moving between providers is thereby enabled to change its private key every time the host entity moves to a new (platform) provider and revoke the current private key. In this way, the old (platform) provider, even if it has access to the current private key, cannot use the credentials of the host entity.

Advantageously, these methods, these host entities, these key issuers, and these computer programs provide efficient protection against attacks that could lead to private key leakage to a third party, e.g. a malicious tenant.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
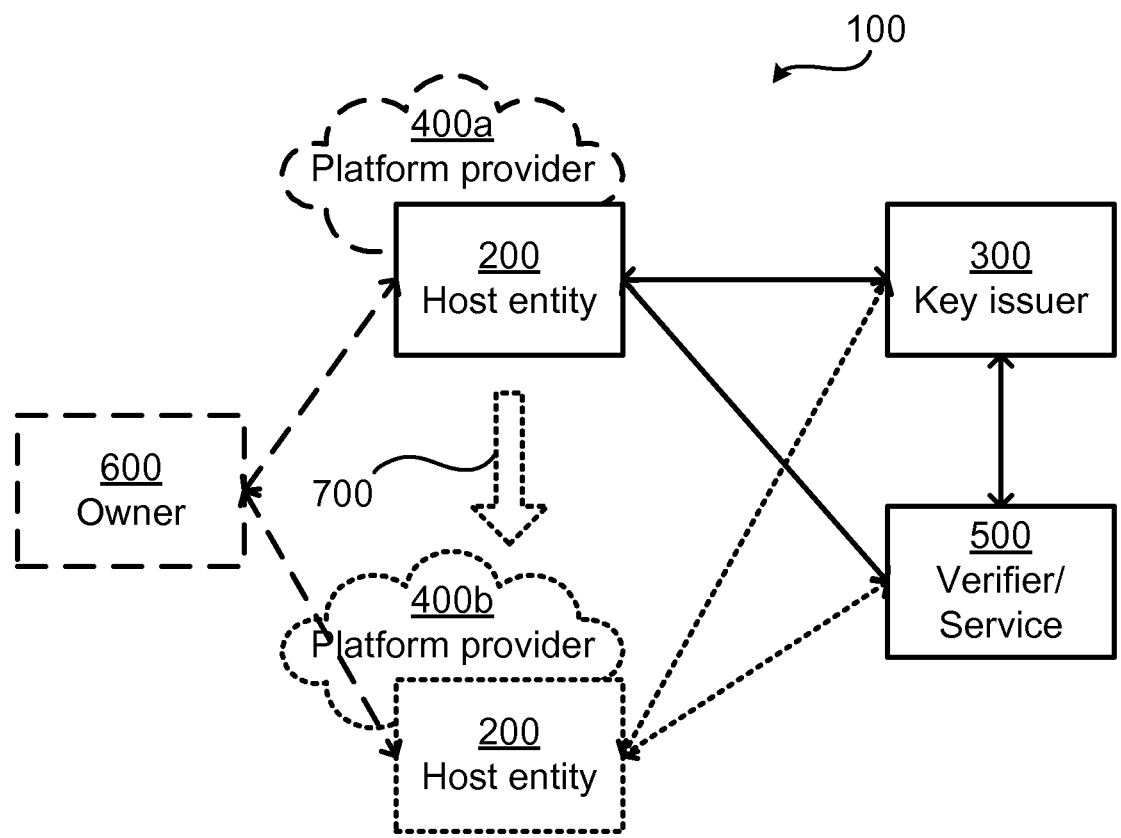
FIG. 1 is a schematic diagram illustrating a communications system according to embodiments.

FIG. 1 is a schematic diagram illustrating a communications system 100 where embodiments presented herein can be applied. The communications system 100 comprises a host entity 200, a key issuer 300, at least one platform provider 400a, 400b (optional), a verifier/service provider 500, and an owner 600 (optional).

The host entity 200 is configured to establish an operative connection to the key issuer 300 to receive its identity (a group public key) and for generating a matching private key. The host entity 200 is configured to use the public key to identity itself and the currently used (active) private key for authenticating itself as the owner of the identity. The host entity 200 is configured to, when moving from one platform provider 400a to another platform provider 400b (as indicated by arrow 700) or otherwise obtains a need to change the private key, to establish an operative connection to the key issuer 300 in order to revoke the current private key and to obtain a new private key. There could be different examples of host entities 200. According to some embodiments the host entity 200 is any of a software or application container, a virtual machine, a virtualization engine, a software appliance, a web server, a network device, a operating system process, or an end-user device.

The key issuer 300 is configured to generate a new group/identity by creating the group public key. The key issuer 300 could be implemented as a service provided by the service provider 500 or it could e.g. be implemented as an application running in an entity of the owner 600 of the host entity 200. The key issuer 200 is further configured to support the host entity 200 to generate private keys linked to the (group) public key and to maintain a private key revocation list, which contains all private keys that have been revoked, or at least information identifying such private keys. The key issuer 300 is configured to share the private key revocation list to the service provider 500, such as pushing the revocation list to the service every time the private key revocation list is updated, or on a regular basis, such once every 10 minutes, once every hour, or once every 24 hours, or the like. Alternatively, as will be further disclosed below, the service provider 500 can pull the private key revocation list from the key issuer 300. Yet alternatively, the service provider 500, and/or other entities, could be configured to enquire the key issuer 300 to check whether the private key is already revoked or not. If so, the service provider 500 needs to send the authentication response of the host entity 200 to the key issuer 300 to have it checked against the private key revocation list.

The service provider 500 is configured to provide one or more services the host entity 200 is to access and which require the host entity 200 to authenticate itself. The service provider 500 could be implemented as an application, a data aggregation and/or storage service, management service and/or server (such as a web server), etc. The host entity 200 is registered at the service provider and is identified with the assigned public key. When the host entity 200 authenticates itself to the service provider 500, the service provider 500 can be configured to verify the private key is not on the private key revocation list, for example by accessing a list of revoked private keys for verifying that the host entity 200 is not using a revoked private key. This could require the host entity 200 to sign a message with its private key and the service provider 500, after verifying the signature with the public key, also verifying that the used private key is not on the private key revocation list (e.g. by verifying that none of the private keys on the list yield the same signature). Further details related thereto will be disclosed below.

As disclosed above, the host entity 200 may run on a platform provider 400a, and might at some point be moved to another platform provider 400b. The platform provider 400a, 400b might be implemented in a cloud computing environment. A platform provider 400a, 400b might or might not have a (v)TPM for the host entity 200. In any case, the platform provider 400a, 400b should never have access to the credentials (such as the private key) of the host entity 200. If there is no secure storage possibility for the private key from the platform provider 400a, 400b, the platform provider 400a, 400b could find out the private key. However, according to the embodiments disclosed herein, the host entity 200 will securely update its private key once it, for example, is moved to a new platform provider 400b. Thus the old platform provider 400a, which might know the private key used when the host entity 200 was hosted by it, will not be able to misuse the private key.

While (v)TPM, when used properly, is effective in terms of protecting security critical information of a virtualized service (and thus of the host entity 200), it cannot be regarded as supported by all network providers. Data (such as credentials and communication protected with those credentials) of a virtualized service could be accessible to the platform provider 400a, 400b. Also, even if (v)TPM is used, a user might still not trust that the credentials of the virtualized service (and thus of the host entity 200) remain protected during operation of the service, for example after the host entity 200 has been migrated to another platform provider 400b.

When considering asymmetric cryptography, the public key is often seen as an identifier of the owner of the private key. Thus, when there is a need to change the private key (e.g. if it has been leaked), the public key, and thus the identity, is, according to state of the art, also changed. This means that a leaked private key results in a big burden to the credential owner as it has to generate a new key pair (consisting of a public key and a private key), which also means getting a new identity (public key). This new identity needs to be updated to all services the credential owner is using.

The embodiments disclosed herein thus relate to mechanisms for updating a private key of a host entity 200. In order to obtain such mechanisms there is provided a host entity 200, a method performed by the host entity 200, a computer program product comprising code, for example in the form of a computer program, that when run on processing circuitry of the host entity 200, causes the host entity 200 to perform the method. In order to obtain such mechanisms there is further provided a key issuer 300, a method performed by the key issuer 300, and a computer program product comprising code, for example in the form of a computer program, that when run on processing circuitry of the key issuer 300, causes the key issuer 300 to perform the method.

In general terms, while the host entity 200 should be able to authenticate itself to a verifier (for example of a remote service provider 500), in some cases it should be impossible for the verifier to violate the privacy and identify an individual host entity 200. One way to protect the privacy is to use a group signature mechanism. In this way, a group of host entities 200 can authenticate themselves to the verifier and identify themselves by their membership public key assigned by a trusted key issuer 300 without exposing their individual identities to the verifier. The host entities 200 of a group can also be revoked if their private credentials are leaked.

Figure 2:
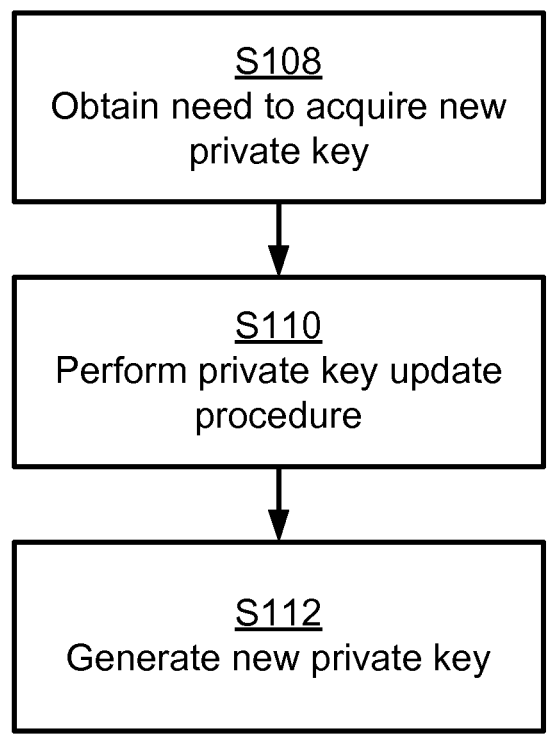
FIGS. 2, 3, 4, and 5 are flowcharts of methods according to embodiments.
Figure 3:
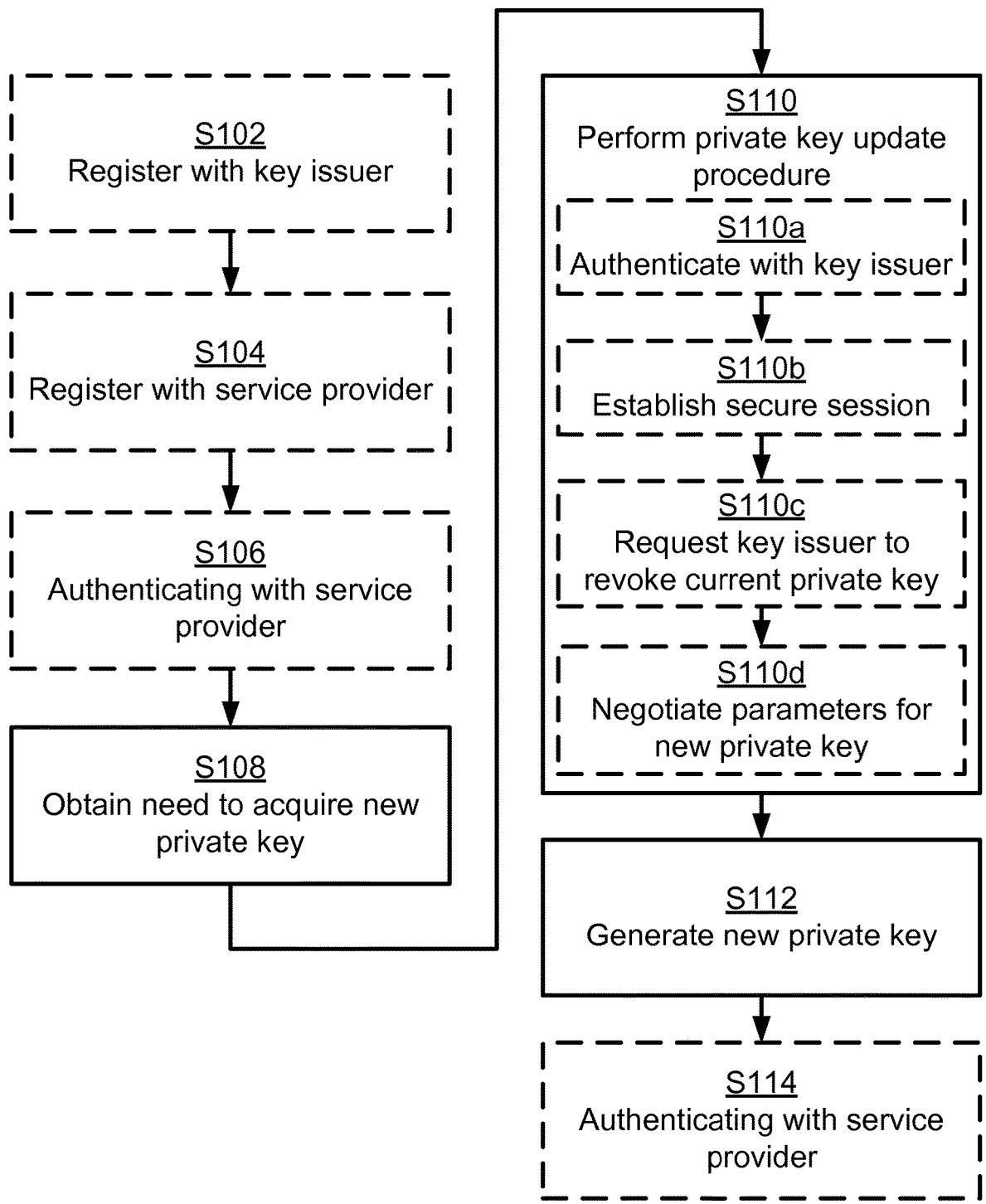
Figure 4:
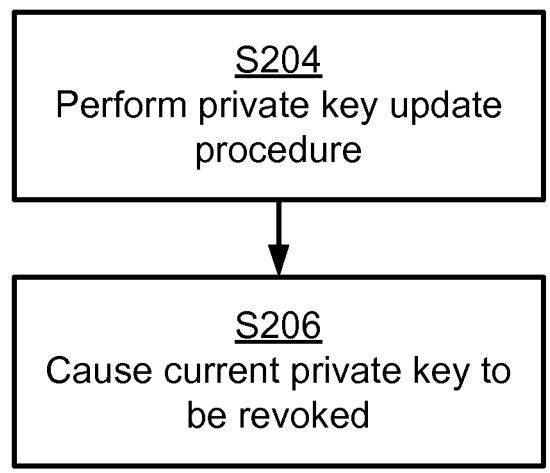
Figure 5:
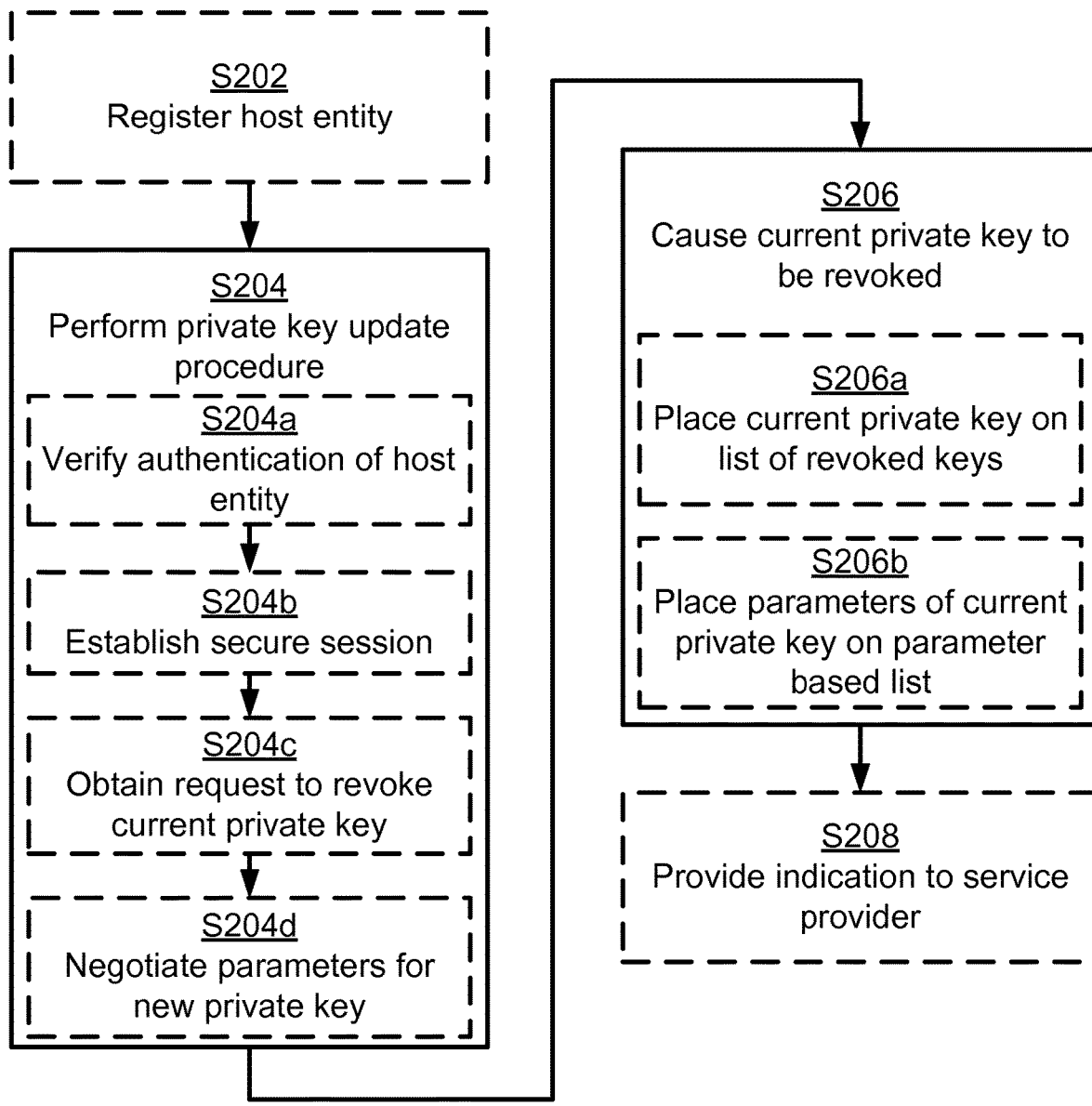

FIGS. 2 and 3 are flow charts illustrating embodiments of methods for updating a private key of a host entity 200 as performed by the host entity 200. FIGS. 4 and 5 are flow charts illustrating embodiments of methods for updating a private key of a host entity 200 as performed by the key issuer 300. The methods are advantageously provided as computer programs 1120a, 1120b.

Reference is now made to FIG. 2 illustrating a method for updating a private key of a host entity 200 as performed by the host entity 200 according to an embodiment.

The private key is based on parameters negotiated between the host entity 200 and the key issuer 300. The host entity 200 further has a group public key that is generated by the key issuer 300 and associated with the private key.

The host entity is configured to perform step S108:

S108: The host entity 200 obtains a need to acquire a new private key.

Different ways for the host entity 200 to obtain such a need will be disclosed below.

The host entity 200 updates the private key once such as need has been obtained. Particularly, the host entity is configured to perform step S110 in response to having performed step S108:

S110: The host entity 200 performs a private key update procedure with the key issuer 300 using the public key and the current private key. Parameters for the new private key are negotiated with the key issuer 300.

An embodiments relating to details of such a private key update procedure as performed by the host entity 200 will be disclosed below.

The host entity 200 generates the new private key once the private key update procedure has been performed. Particularly, the host entity is configured to perform step S112:

S112: The host entity 200 generates the new private key using the negotiated parameters.

Embodiments relating to further details of updating a private key of a host entity 200 as performed by the host entity 200 will now be disclosed.

Reference is now made to FIG. 3 illustrating methods for updating a private key of a host entity 200 as performed by the host entity 200 according to further embodiments. It is assumed that steps S108, S110, S112 are performed as described above with reference to FIG. 2 and a thus repeated description thereof is therefore omitted.

There may be different ways for the host entity 200 to act before obtaining the need to acquire the new private key, as in step S108. Embodiments relating thereto will now be described in turn.

In some aspects the host entity 200 registers itself with the key issuer 300, whereby the group public key is provided to the host entity 200 from the key issuer 300. Hence, according to an embodiment the host entity 200 is configured to perform step S102:

S102: The host entity 200 registers itself with the key issuer 300 in order to obtain the group public key. At least one of the group public key and the parameters for generating the private key is obtained from the key issuer 300 in response thereto. The public key could be pre-configured to the host entity 200 in which case the host entity 200 would only need to obtain the private key parameters from the key issuer 300.

In some aspects the identity of the host entity 200, i.e. its public key, is configured to the service(s) where the identity will be used. Hence, according to an embodiment the host entity 200 is configured to perform step S104:

S104: The host entity 200 registers with the service provider 500 for use of a service at the service provider 500. The host entity 200 performs this registration by providing the group public key and information of the key issuer 300 to the service provider 500 on behalf of an owner 600 of the host entity 200. Examples of such information include, but are not limited to, an issuer certificate, a fully qualified domain name (FQDN) or Uniform Resource Locator (URL), Internet Protocol (IP) address, private key revocation list location (given e.g. by a FQDN, URL, or IP address), and possibly other information, e.g. contact information such as a phone number or an email address. Alternatively, the host owner 600 registers the host entity 200 with the service provider 500 and step S104 is thus not performed by the host entity 200.

In some aspects the host entity 200 authenticates itself with a service and uses the service using the current private key. Hence, according to an embodiment the host entity 200 is configured to perform step S106:

S106: The host entity 200 authenticates itself with the service provider 500 using the group public key and the current private key when using the service.

There may be different ways for the host entity 200 to obtain the need to acquire the new private key, as in step S108. The need could be obtained by the host entity 200 having obtained an indication of leakage of the current private key, or by the host entity 200 having switched from a first platform provider 400a to a second platform provider 400b since having obtained the current private key, or by a policy. Such a policy could stipulate that the host entity 200 should, or even is required to, update its private key on a regular basis.

There may be different ways for the host entity 200 to perform the private key update procedure as in step S10. According to an embodiment the host entity 200 is configured to perform steps S110a-S110d in order to perform the private key update procedure.

S110a: The host entity 200 authenticates itself with the key issuer 300 using the public key and the current private key.

S110b: The host entity 200 establishes a secure session with the key issuer 300 using security credentials of the key issuer 300.

In general terms, any type of security credentials could be used. Examples include, but are not limited to, certificate based credentials, i.e. regular asymmetric key pair signed by a certificate authority, but also raw public key based identity, self-signed certificate based identity or shared secret based identity could be used.

When the host entity 200 contacts the key issuer 300 in order to revoke the current private key and to negotiate parameters of a new replacing private key, e.g. the key issuer's public key is used for establishing a secure connection. That is, security might not solely rely on the private key of the host entity 200 because there might be a malicious party (such as an old platform provider 400a or a malign tenant) that also possesses the private key. Once a secure connection has been established, the host entity 200 can communicate the request to revoke the current private key.

S110c: The host entity 200 requests the key issuer 300 to revoke the current private key.

In some aspects, the host entity 200 explicitly provides the private key to be revoked to the key issuer 300. This could be the case if the host entity 200 is not the only host entity having the group public key. In further aspects, as an alternative to step S110c, it is also possible that when the host entity 200 negotiates new parameters, the key issuer 300 revokes the current private key implicitly, without any specific request from the host entity 200.

The key issuer 300 can verify that the private key is the currently active private key (i.e. that is not on the private key revocation list and it is indeed matching the corresponding public key).

S110d: The host entity 200 negotiates parameters for the new private key with the key issuer 300.

In some aspects, in some cases the parameters could be used for updating the current private key, i.e. updating some parameters of the current private key with new parameters negotiated with the key issuer 300. In this case, the current private key with current parameters still needs to be revoked.

There may be different ways for the host entity to act once it has generated the new private key, as in step S112. In some aspects the host entity 200 authenticates itself with the service and uses the service using the new private key. Hence, according to an embodiment the host entity 200 is configured to perform step S114:

S114: The host entity 200 authenticates itself with the service provider 500 using the group public key and the new private key when using the service.

Reference is now made to FIG. 4 illustrating a method for updating a private key of a host entity 200 as performed by the key issuer 300 according to an embodiment.

As disclosed above, the private key is based on parameters negotiated between the host entity 200 and the key issuer 300. As also disclosed above, the host entity 200 further has a group public key that is generated by the key issuer 300 and associated with the private key. It is understood that during the lifetime span of the of the public key it could, in total, be associated with multiple private keys, although only one at a time.

As further disclosed above, the host entity 200 in step S110 performs a private key update procedure with the key issuer 300. Hence, the key issuer 300 is configured to perform step S204:

S204: The key issuer 300 performs a private key update procedure with the host entity 200 using the public key and the current private key. Parameters for the new private key are negotiated with the host entity 200.

Once parameters for the new private key have been negotiated the host entity 200 is enabled to generate a new private key, as in step S112. The current private key is therefore to be revoked. Hence, the key issuer 300 is configured to perform step S206:

S206: The key issuer 300 causes the current private key to be revoked.

Embodiments relating to further details of updating a private key of a host entity 200 as performed by the key issuer 300 will now be disclosed.

Reference is now made to FIG. 5 illustrating methods for updating a private key of a host entity 200 as performed by the key issuer 300 according to further embodiments. It is assumed that steps S204, S206 are performed as described above with reference to FIG. 4 and a thus repeated description thereof is therefore omitted.

As disclosed above, the host entity 200 in an optional step S102 registers with the key issuer 300. Hence, according to an embodiment the key issuer 300 is configured to perform step S202:

S202: The key issuer 300 registers the host entity 200. The key issuer 300 generates the group public key and provides the private key (or at least parameters for generating the private key) to the host entity 200 in response to the host entity 200 being registered.

Different ways for the host entity 200 to perform the private key update procedure have been disclosed above. There may be correspondingly different ways for the key issuer 300 to perform the private key update procedure. According to an embodiment the key issuer 300 is configured to perform steps S204a-S204d in order to perform the private key update procedure.

S204a: The key issuer 300 verifies authentication of the host entity 200 using the public key and the current private key.

S204b: The key issuer 300 establishes a secure session with the host entity 200 using security credentials of the key issuer 300.

S204c: The key issuer 300 obtains a request from the host entity 200 to revoke the current private key.

In this respect, in step S204a the key issuer 300 alternatively does not have the private key of the host entity 200. In such situations the authentication is performed by using the public key for verifying that the host entity 200 possesses a private key that is linked to the public key (and, optionally, verifying that that private key is not on the private key revocation list, which can be performed later, such as in any of steps S204c and S206a).

As noted above, in some aspects, the host entity 200 explicitly provides the private key to be revoked to the key issuer 300. This could be the case if the host entity 200 is not the only host entity having the group public key. In further aspects, as an alternative to step S204c, it is also possible that when the host entity 200 negotiates new parameters, the key issuer 300 revokes the current private key implicitly, without having obtained any specific request from the host entity 200.

S204d: The key issuer 300 negotiates parameters for the new private key with the host entity 200.

There could be different ways for the key issuer 300 to cause the current private key to be revoked as in step S206. Different embodiments relating thereto will now be disclosed.

In some aspects the key issuer 300 places the current private key of the host entity 200 on the private key revocation list. Hence, according to an embodiment the key issuer 300 is configured to perform step S206a as part of step S206:

S206a: The key issuer 300 places the current private key on the private key revocation list after having verified that the current private does not match any private keys already on the private key revocation list whilst still producing valid authentication of the host entity 200.

In some aspects the key issuer 300 places parameters of the current private key on a parameter based private key revocation list. Hence, according to an embodiment the key issuer 300 is configured to perform step S206b as part of step S206:

S206b: The key issuer 300 places parameters of the current private key on a parameter based private key revocation list after having verified that the parameters of the current private key do not match any parameters of private keys already on the private key revocation list whilst still producing valid authentication of the host entity 200.

With respect to any of steps S206a, S206b, the host entity 200 may send its private key (or parameters of it) to the key issuer 300 so that the key issuer 300 can just compare the private key (or parameters) to the private keys (or parameters) on the private key revocation list. If there is no match and the private key does in fact produce the signature or authentication response used for authentication (the key issuer 300 could, for example, perform signature calculations or calculate the response to the authentication challenge with the received private key and verify that it produces the same signature or authentication response as used by the host entity 200 for authentication with the key issuer 300), the private key is the currently "enabled" one and can be placed on the private key revocation list.

The parameter based private key revocation list could be implemented using mechanisms from group based signature schemes.

There could be different ways for the key issuer 300 to act once the current private key has been revoked. In some aspects the key issuer 300 makes the private key revocation list accessible to the service(s) registered for the public key, for example by pushing the private key revocation list to the service provider 500. Hence, according to an embodiment the key issuer 300 is configured to perform step S208:

S208: The key issuer 300 provides an indication that the current private key has been revoked to the service provider 500.

On example of such an indication is for the key issuer 300 to notify the service provider that the private key revocation list has been updated. However, in general terms, the indication provided in step S208 could involve either pushing the private key revocation list (or an indication of private key revocation list update) to the service provider 500 or making the private key revocation list available for download to the service provider 500 so that the service provider 500 can pull it. The private key revocation list might be provided by the key issuer 300 to the service provider 500 or it might be based on a previous request by the service provider 500 to have the private key revocation list.

Embodiments equally applicable to the methods performed by the host entity 200 and methods performed by the key issuer 300 will now be disclosed.

In some embodiments the group public key is left unchanged in conjunction with performing the private key update procedure. In some aspects, some group signing schemes implementing their own revocation cause some parameters of the public key to be modified every time a private key of the group is revoked.

In some embodiments the group public key is valid for a group of host entities, and the host entity 200 is the only member of this group of host entities. Essentially this makes the group identity define a host identity. Further in this respect, revocation of members is supported by some but not all group signature schemes. Typically it is the verifier of the service provider 500 or the key issuer 300 that performs the revocation of a private key/group members. This is due to the use cases typically envisioned for group signatures. A host entity 200 would only notice that its private key has been compromised if it detects the attack that compromises the private key or if it tries to verify a signature created with its own leaked private key and in addition to signature verification checks if the signature was created by its own private key (which is not typical behavior). As group signatures schemes provide anonymity the private keys are typically not used for accessing client specific service from where it would be possible to notice if someone else has accessed the client specific account.

In some embodiments the parameters negotiated for the new private key are chosen and handled in mathematically complex ways to get proper relationships between the parameters in the public key and the private keys.

One particular embodiment for updating a private key of a host entity 200 based on at least some of the above disclosed embodiments and as performed by the host entity 200 and the key issuer 300 will now be disclosed in detail.

As disclosed above, the host entity 200 is assigned a group public key by the key issuer 300, and it negotiates parameters of a private key with the key issuer 300. Later, when the host entity 200 needs to change its private key, e.g. due to moving from one platform provider 400a to another platform provider 400b, the host entity 200 contacts the key issuer 300 to have its current private key revoked and to negotiate parameters of a new private key in a similar way as a new member to the group would negotiate its private key. Thus, the host entity 200 might at all the time be the only member of the group, and can thus change its private key when needed. The key issuer 300 could be configured to not accept new members to a group once a first member (as defined by the host entity 200) has bene added. This means that only entities with a currently not revoked private key can perform the key update procedure and thus get parameters for a private key.

S301: The host entity 200 registers itself at the key issuer 300 to get an identity.

S302: The key issuer 300 initializes a new group and generates a new group public key (denoted K_pub). Alternatively, the key issuer 300 generates K_pub in advance. The key issuer 300 assigns this identity/public key to the host entity 200.

S303: The key issuer 300 sends the public key to the host entity 200. Alternatively, the public key is provided to the host entity 200 even before bootstrapping as part of the device configuration of the host entity 200.

S304: The host entity 200 and the key issuer 300 negotiate the private key parameters for the private key (denoted K_priv) of the host entity 200.

S305: The host entity 200 generates the private key K_priv.

S306: The identity of the host entity 200, i.e. the public key, is configured to the service provider(s) 500 where the identity will be used. This configuration comprises providing the public key and information of the key issuer 300 to the service provider 500. The latter is needed in order for the service provider 500 to know from where the private key revocation list is accessible. The key issuer 300 can be configured with information about the service provider(s) 500 of the service(s) where the identity will be used so that the key issuer 300 knows for what service provider(s) 500 the private key revocation list is to be made accessible.

Figure 6:
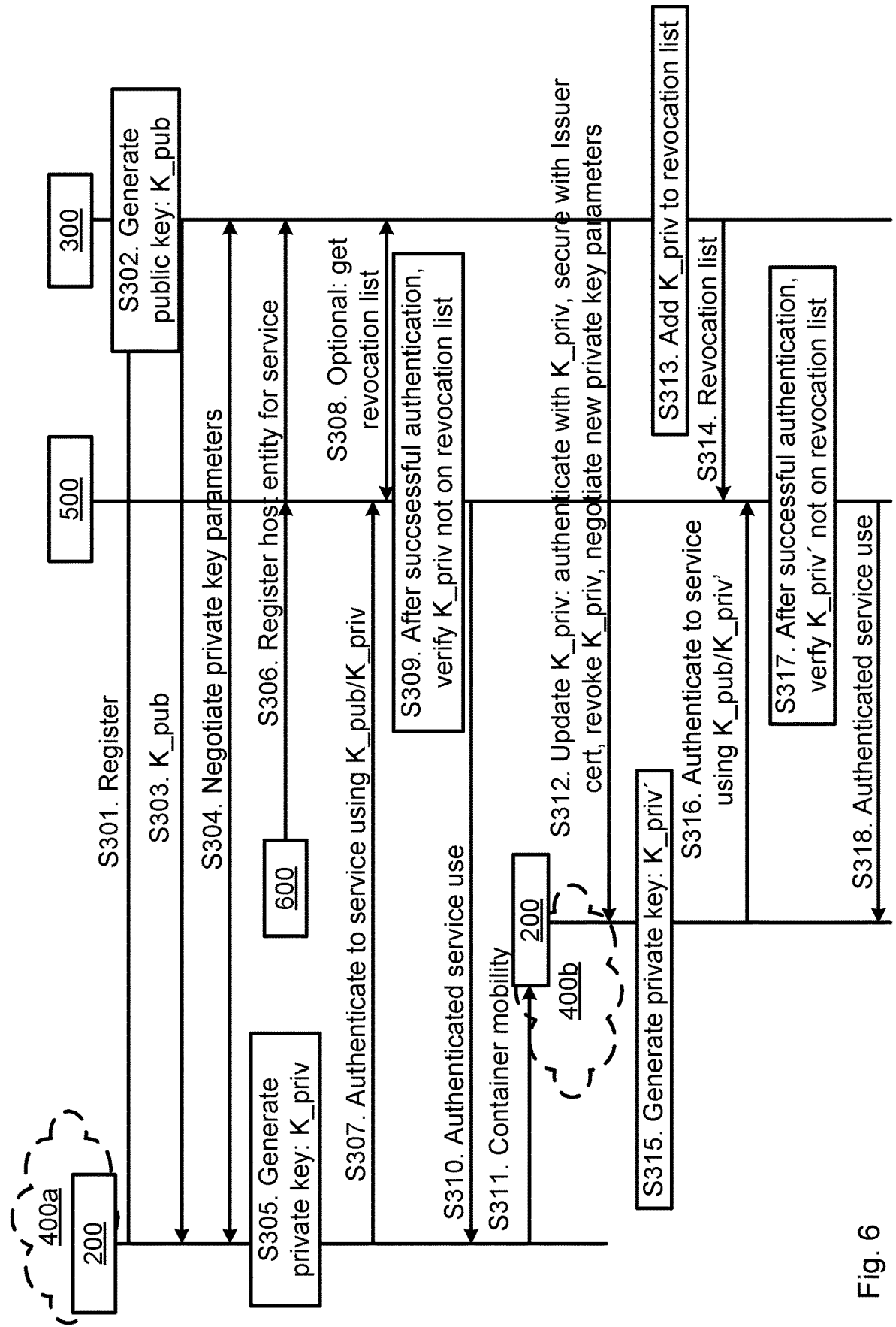
FIG. 6 is a signalling diagram according to embodiments.

In FIG. 6 step S306 is illustrated as being performed by the owner 600 of the host entity 200, but other alternatives are possible. For example, the host entity 200 could be configured to perform an automatic registration/profile creation when first accessing the service provider 500.

S307: The host entity 200 authenticates to the service of the service provider 500 using the public/private key pair (K_pub/K_priv).

S308: The service provider 500 optionally accesses the private key revocation list from the key issuer 300.

S309: The service provider 500 authenticates the host entity 200 and, if the service provider 500 has access to the private key revocation list, verifies whether the used private key is revoked or not.

S310: The host entity 200 uses the service of the service provider 500, assuming that the current private key has not been revoked.

S311: The host entity 200 switches platform providers 400a, 400b, or for some other reason needs to obtain a new private key.

S312: The host entity 200 performs a private key update procedure with the key issuer 300. During the key update procedure the host entity 200 authenticates itself with the current private key (K_priv). The session is secured with credentials of the key issuer 300 since the host entity 200 (and or the key issuer 300) cannot fully trust that the current private key has not been leaked. The host entity 200 requests it current private key to be revoked. The host entity 200 and the key issuer 300 negotiate new private key parameters, similar to step S304.

S313: The key issuer 300 places the current private key of the host entity 200 on the private key revocation list.

S314: The key issuer 300 makes the private key revocation list accessible to the service provider(s) 500 registered for this identity/public key.

S315: The host entity 200 generates a new private key (K_priv'), similar to step S315.

S316: The host entity 200 once again authenticates itself to the service provider 500 using the public/private key pair (K_pub/K_priv'), similar to step S307.

S317: The service provider 500 authenticates the host entity 200 and, if the service provider 500 has access to the private key revocation list, verifies whether the used new private key is revoked or not, similar to step S309.

S318: The host entity 200 uses the service of the service provider 500, assuming that the new private key has not been revoked.

Typically according to state of the art, it is not the owner of the private key that causes a private key in a group signature scheme to be revoked. However, this is the case as a group signature scheme is applied for groups of size of a single member (i.e. one singe host entity 200). This, of course, negates the privacy benefit typically associated with group signing schemes, where more group members improves privacy.

The herein disclosed embodiments are applicable in various scenarios. Some non-limiting examples of such scenarios will be presented next.

The herein disclosed embodiments are applicable in scenarios relating to traditional Information Technology (IT) services. For example, the host entity 200 could be a monolithic web server (front-end) and the service provided by the service provider 500 is a back-end server and that the web-server and the back-end-server are configured to communicate with each other. The back-end-server could then be, e.g. a database server which would usually require authentication e.g. in the form of asymmetric keys. It could be also that the database access would be based on passwords, but protected by underlying e.g. a virtual private network (VPN) or a Secure Shell (SSH) connection authenticated using a public key.

The herein disclosed embodiments are applicable in scenarios relating to next generation IT services where, instead of the host entity 200 being a monolithic web server, the functionality of the host entity 200 is distributed between modules on a plurality of web servers. Compared to monolithic services, this means that there will be network communications between the modules that need to be authenticated. Any VPN or SSH based authentication could be used with public key based authentication.

The herein disclosed embodiments are applicable in scenarios relating to secure host entity mesh networking. For example, passphrases (symmetric encryption) can be used to create secure tunnels between host entities 200. The herein disclosed embodiments could be used for such scenarios such that instead of passphrases, a public-key based tunneling scheme is be employed. One benefit is that when the host entity 200 migrates (or is restarted) to another computing cloud, its public key based identity could remain the same. That is, with asymmetric keys, if the public key is not changed, only the private key at the host entity 200 needs to be updated whilst the service providers 500 will still identify the host entity 200 with the same public key and authenticate the host entity 200 based on the private key the client possesses.

The herein disclosed embodiments are applicable in scenarios relating to telecommunications. For example, service chaining is employed in Network Function Virtualization (NFV). This means that e.g. network address translation is implemented in one virtual machine (or host entity 200) and a firewall in another virtual machine (or host entity 200). The machines need to be connected together in a secure way, which could be achieved using the herein disclosed embodiments. Further, a non-virtualized host entity 200, which could be e.g. a base station such as an evolved nodeB (eNB) or a next generation nodeB (gNB), could have a (group scheme based) public key based identity for authenticating itself and securing communication to the core network. Using the herein disclosed embodiments the non-virtualized host entity 200 could at some point change its private key whilst still maintaining its public key based identity.

Figure 7:
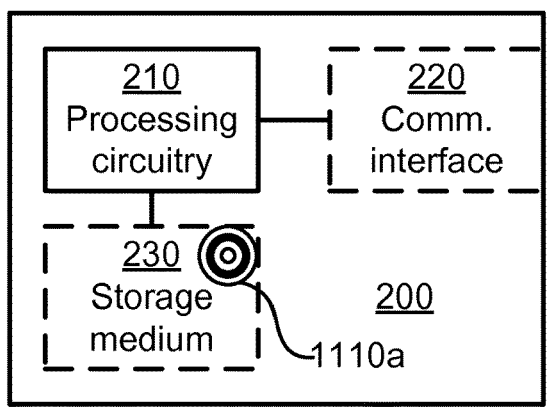
FIG. 7 is a schematic diagram showing functional units of a host entity according to an embodiment.

FIG. 7 schematically illustrates, in terms of a number of functional units, the components of a host entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the host entity 200 to perform a set of operations, or steps, S102-S114, as disclosed above. For example, the storage medium 230 may store the set of operations, and the processing circuitry 210 may be configured to retrieve the set of operations from the storage medium 230 to cause the host entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The host entity 200 may further comprise a communications interface 220 for communications with other entities of the communications system 100. As such the communications interface 220 may comprise one or more transmitters and receivers, comprising analogue and digital components.

The processing circuitry 210 controls the general operation of the host entity 200 e.g. by sending data and control signals to the communications interface 220 and the storage medium 230, by receiving data and reports from the communications interface 220, and by retrieving data and instructions from the storage medium 230. Other components, as well as the related functionality, of the host entity 200 are omitted in order not to obscure the concepts presented herein.

Figure 8:
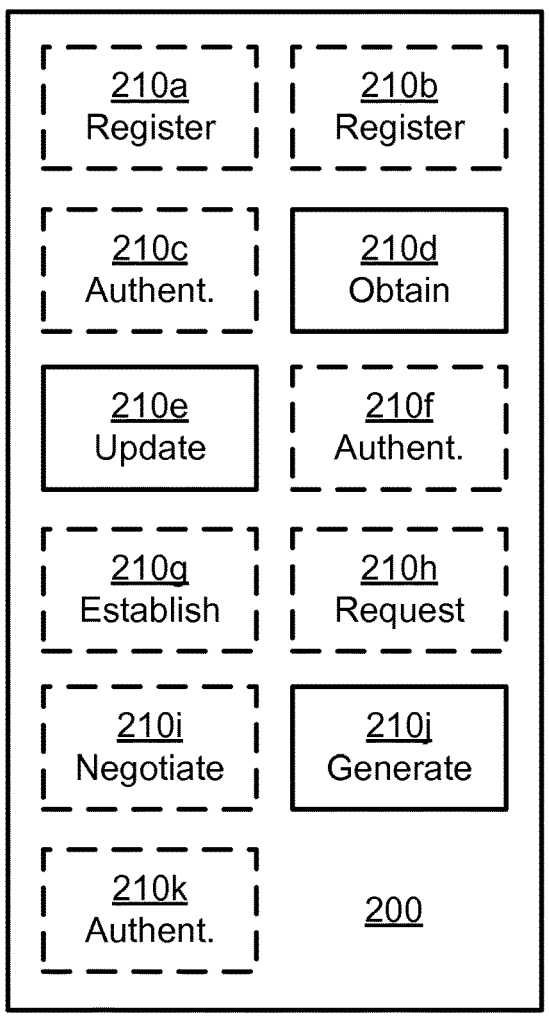
FIG. 8 is a schematic diagram showing functional modules of a host entity according to an embodiment.

FIG. 8 schematically illustrates, in terms of a number of functional modules, the components of a host entity 200 according to an embodiment. The host entity 200 of FIG. 8 comprises a number of functional modules; an obtain module 210e configured to perform step S108, an update module 210e configured to perform step S110, and a generate module 210b configured to perform step S112. The host entity 200 of FIG. 8 may further comprise a number of optional functional modules, such as any of a register module 210a configured to perform step S102, a register module 210b configured to perform step S104, an authentication module 210c configured to perform step S106, an authentication module 210f configured to perform step S110a, an establish module 210g configured to perform step Snob, a request module 210h configured to perform step S110c, a negotiate module 210i configured to perform step S110d, and an authentication module 210k configured to perform step S114. In general terms, each functional module 210a-210k may be implemented in hardware or in software. Preferably, one or more or all functional modules 210a-210k may be implemented by the processing circuitry 210, possibly in cooperation with functional units 220 and/or 230. The processing circuitry 210 may thus be arranged to from the storage medium 230 fetch instructions as provided by a functional module 210a-210k and to execute these instructions, thereby performing any steps of the host entity 200 as disclosed herein.

Figure 9:
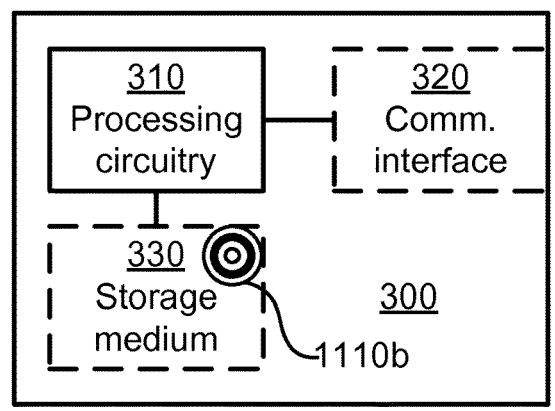
FIG. 9 is a schematic diagram showing functional units of a key issuer according to an embodiment.

FIG. 9 schematically illustrates, in terms of a number of functional units, the components of a key issuer 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 1), e.g. in the form of a storage medium 330. The processing circuitry 310 may further be provided as at least one application specific integrated circuit (ASIC), or field programmable gate array (FPGA).

Particularly, the processing circuitry 310 is configured to cause the key issuer 300 to perform a set of operations, or steps, S202-S208, as disclosed above. For example, the storage medium 330 may store the set of operations, and the processing circuitry 310 may be configured to retrieve the set of operations from the storage medium 330 to cause the key issuer 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The key issuer 300 may further comprise a communications interface 320 for communications with other entities of the communications system 100. As such the communications interface 320 may comprise one or more transmitters and receivers, comprising analogue and digital components.

The processing circuitry 310 controls the general operation of the key issuer 300 e.g. by sending data and control signals to the communications interface 320 and the storage medium 330, by receiving data and reports from the communications interface 320, and by retrieving data and instructions from the storage medium 330. Other components, as well as the related functionality, of the key issuer 300 are omitted in order not to obscure the concepts presented herein.

Figure 10:
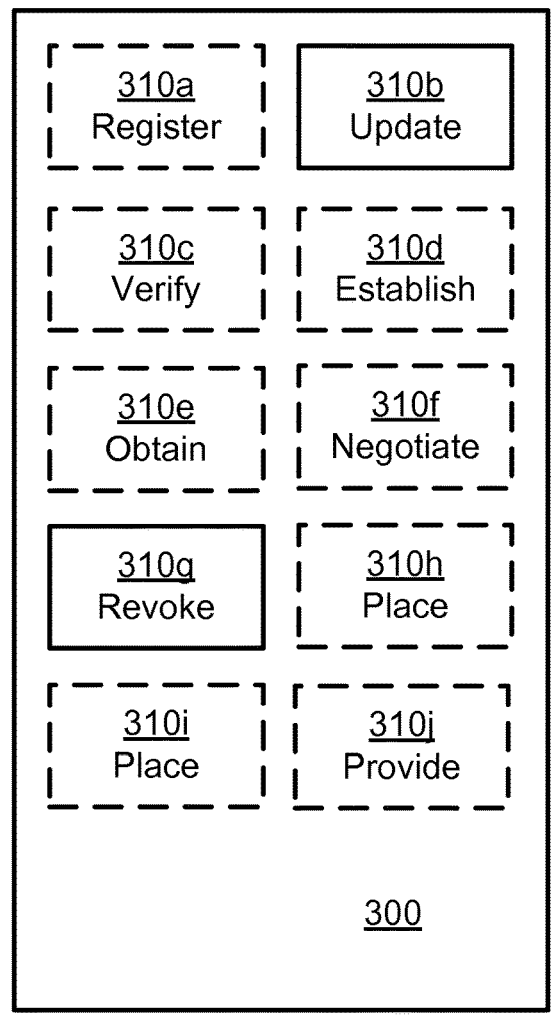
FIG. 10 is a schematic diagram showing functional modules of a key issuer according to an embodiment.

FIG. 10 schematically illustrates, in terms of a number of functional modules, the components of a key issuer 300 according to an embodiment. The key issuer 300 of FIG. 10 comprises a number of functional modules; an update module 310b configured to perform step S204, and a revoke module 310 configured to perform step S206. The key issuer 300 of FIG. 10 may further comprise a number of optional functional modules, such as any of a register module 310a configured to perform step S202, a verify module 310c configured to perform step S204a, an establish module 310d configured to perform step S204b, an obtain module 310e configured to perform step S204c, a negotiate module 310f configured to perform step S204d, a place module 310h configured to perform step S206a, a place module 310i configured to perform step S206b, and a provide module 310j configured to perform step S208. In general terms, each functional module 310a-310j may be implemented in hardware or in software. Preferably, one or more or all functional modules 310a-310j may be implemented by the processing circuitry 310, possibly in cooperation with functional units 320 and/or 330. The processing circuitry 310 may thus be arranged to from the storage medium 330 fetch instructions as provided by a functional module 310a-310j and to execute these instructions, thereby performing any steps of the key issuer 300 as disclosed herein.

The host entity 200 and/or the key issuer 300 may be provided as a standalone device or as a part of at least one further device. Alternatively, functionality of the host entity 200 and/or the key issuer 300 may be distributed between at least two devices, or nodes. Thus, a first portion of the instructions performed by the host entity 200 and/or the key issuer 300 may be executed in a first device, and a second portion of the of the instructions performed by the host entity 200 and/or the key issuer 300 may be executed in a second device; the herein disclosed embodiments are not limited to any particular number of devices on which the instructions performed by the host entity 200 and/or the key issuer 300 may be executed. Hence, the methods according to the herein disclosed embodiments are suitable to be performed by a host entity 200 and/or a key issuer 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210k, 310a-310j of FIGS. 8 and 10 and the computer programs 1120a, 1120b of FIG. 11 (see below).

Figure 11:
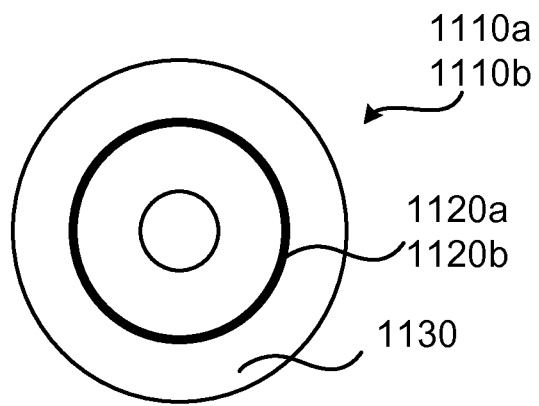
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the host entity 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the key issuer 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for updating a private key of a host entity having a current private key, the method comprising:
   the host entity detecting a need to acquire a new private key to replace the current private key; and
   in response to detecting the need to acquire the new private key:
   i) the host entity performing a private key update procedure with a key issuer using i) a public key associated with the current private key and ii) the current private key, wherein performing the private key update procedure with the key issuer comprises the host entity negotiating parameters for use in generating the new private key with the key issuer; and
   ii) the host entity generating the new private key using the negotiated parameters; and
   requesting the key issuer to revoke the current private key.

2. The method of claim 1, wherein performing the private key update procedure comprises:
   the host entity using the public key and the current private key to authenticate itself with the key issuer.

3. The method of claim 1, further comprising:
   prior to detecting the need to acquire a new private key, the host transmitting to the key issuer a registration request message; and
   the host receiving a response message responsive to the registration request message, wherein the response message comprises the public key.

4. The method of claim 1, further comprising:
   after generating the new private key, the host entity transmitting to a service provider a registration message comprising the public key and information identifying the key issuer.

5. The method of claim 4, further comprising:
   after generating the new private key, the host entity using the public key and the new private key to authenticate itself with the service provider.

6. The method of claim 1, wherein detecting a need to acquire a new private key to replace the current private key comprises:
   detecting a leakage of the current private key, or
   detecting a switch from a first platform provider to a second platform provider, or by a policy.

7. The method of claim 4, further comprising:
   the host entity using the public key and the new private key to authenticate itself with the service provider.

8. The method of claim 1, wherein the public key is left unchanged in conjunction with performing the private key update procedure.

9. The method of claim 1, wherein the public key is valid for a group of host entities, and wherein the host entity is the only member of said group of host entities.

10. The method of claim 1, wherein the host entity is any of a software container, an application container, a virtual machine, a virtualization engine, a software appliance, a web server, a network device, or an end-user device.

11. A method for updating a private key of a host entity, the method comprising:
    a key issuer receiving a request from the host entity indicating that the host entity has detected a need to generate a new private key to replace a current private key previously generated by the host entity;
    in response to receiving the request, the key issuer performing a private key update procedure with the host entity using i) a public key associated with the current private key and ii) the current private key, wherein performing the private key update procedure with the host entity comprises negotiating parameters for use in generating the new private key with the host entity; and
    causing the current private key to be revoked.

12. The method of claim 11, wherein the private key update procedure comprises:
    using the public key and the current private key to verify authentication of the host entity;
    establishing a secure session with the host entity using security credentials of the key issuer; and
    obtaining a request from the host entity to revoke the current private key.

13. The method of claim 11, further comprising:
    receiving a registration request message transmitted by the host entity; and
    transmitting to the host entity a response message responsive to the registration request message, wherein the response message comprises the public key.

14. The method of claim 11, wherein causing the current private key to be revoked comprises:
    determining whether the current private key does not match any private key included in a private key revocation list; and
    as a result of determining the current private key does not match any private key included in the private key revocation list, adding the current private key to the private key revocation list.

15. The method of claim 11, wherein causing the current private key to be revoked comprises:
    adding parameters of the current private key to a parameter based private key revocation list.

16. The method of claim 11, wherein
    the public key is registered for use of a service at a service provider, and
    the method further comprises:
    providing to the service provider an indication that the current private key has been revoked.

17. A host, the host entity comprising:
processing circuitry; and
a storage medium storing instructions that, when executed by the processing circuitry, cause the host entity to:
detect a need to acquire a new private key; and
in response to detecting the need to acquire the new private key:
i) perform a private key update procedure with a key issuer using the public key and the current private key, wherein performing the private key update procedure with the key issuer comprises negotiating parameters for the new private key with the key issuer; and
ii) generate the new private key using the negotiated parameters; and
request the key issuer to revoke the current private key.

18. A key issuer, the key issuer comprising:
a receiver for receiving a request from a host entity indicating that the host entity has detected a need to generate a new private key to replace a current private key previously generated by the host entity;
processing circuitry; and
a storage medium storing instructions that, when executed by the processing circuitry, cause the key issuer to:
perform a private key update procedure with a host entity, wherein performing the private key update procedure with the host entity comprises negotiating parameters for the new private key with the host entity; and
cause the current private key previously generated by the host entity to be revoked.

19. A computer program product comprising a non-transitory computer readable medium storing a computer program, the computer program comprising computer code which, when run on processing circuitry of a host entity, causes the host entity to:
detect a need to acquire a new private key; and
in response to detecting the need to acquire a new private key:
i) perform a private key update procedure with a key issuer using the public key and the current private key, wherein performing the private key update procedure comprises negotiating parameters for the new private key with the key issuer; and
ii) generate the new private key using the negotiated parameters; and
request the key issuer to revoke the current private key.

20. A computer program product comprising a non-transitory computer readable medium storing a computer program, the computer program comprising computer code which, when run on processing circuitry of the key issuer, causes the key issuer to:
process a request from a host entity indicating that the host entity has detected a need to generate a new private key to replace a current private key previously generated by the host entity;
perform a private key update procedure with the host entity, wherein performing the private key update procedure with the host entity comprises negotiating parameters for the new private key with the host entity; and
cause the current private key to be revoked.

* * * * *